US012786052B2

(12) United States Patent
Sasidharan et al.

(10) Patent No.: US 12,786,052 B2
(45) Date of Patent: Nov. 3, 2026

(54) CONTROLLER IDENTIFICATION DURING ONBOARDING OF A DEVICE OR GROUP OF DEVICES USING USER INTENT INPUT

(71) Applicant: Cisco Technology, Inc., San Jose, CA (US)

(72) Inventors: Ajit Sasidharan, Cary, NC (US); Reshmi Raj Chittette Rajappan, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 41 days.

(21) Appl. No.: 18/987,593

(22) Filed: Dec. 19, 2024

(65) Prior Publication Data

US 2026/0180851 A1 Jun. 25, 2026

(51) Int. Cl.
*H04L 41/08* (2022.01)
*G06F 40/30* (2020.01)

(52) U.S. Cl.
CPC .............. *H04L 41/08* (2013.01); *G06F 40/30* (2020.01)

(58) Field of Classification Search
None
See application file for complete search history.

(56) References Cited

U.S. PATENT DOCUMENTS

2012/0256728 A1* 10/2012 Bajic .................. G06K 7/10019 340/10.1
2016/0124400 A1* 5/2016 Kanayama ............ H02M 7/493 307/116
2019/0058586 A1* 2/2019 Kumar .................... H04W 4/70
2020/0335128 A1* 10/2020 Sheeder .................. G10L 15/04
2021/0160340 A1* 5/2021 Narayanan .............. H04L 67/53
2021/0194760 A1* 6/2021 Barton .................. H04L 43/026
2023/0009787 A1 1/2023 Smith et al.
2023/0081990 A1* 3/2023 Saini ..................... H04W 8/205 370/338
2023/0412581 A1* 12/2023 Schatzmann ....... H04L 41/0803
2024/0147560 A1* 5/2024 Yang ..................... H04W 76/18
2024/0354567 A1 10/2024 Duggal et al.

OTHER PUBLICATIONS

Jusuf. "Build Advanced Voice User Interfaces with Enhanced Recognition, Anti-Spoofing and Speaker Identification" published Nov. 22, 2024 (Year: 2024).*
"Cisco Open Plug-n-Play Agent Configuration Guide, Cisco IOS Release15SY". Revised Dec. 16, 2014 (Year: 2014).*
Maksuti S., et al., "Automated and Secure Onboarding for System of Systems", IEEE Access, Aug. 3, 2021, vol. 9, pp. 111095-111113.

* cited by examiner

*Primary Examiner* — Scott B Christensen
(74) *Attorney, Agent, or Firm* — Polsinelli P.C.

(57) ABSTRACT

Disclosed is technology that provides an easier and more convenient method for onboarding network devices by allowing the use of user input (e.g., voice commands) to input network device and network controller configurations. The technology can receive user input and determine the intent of the user from the user input. The technology can then execute the necessary configurations and choose the appropriate controller that will provision the device onboarding configurations. Thereafter, the technology can register the device with the controller and configure the network accordingly.

17 Claims, 5 Drawing Sheets

CONTROLLER IDENTIFICATION DURING ONBOARDING OF A DEVICE OR GROUP OF DEVICES USING USER INTENT INPUT

TECHNICAL FIELD

The present disclosure relates to network communication, and in particular to the onboarding of devices into a network.

BACKGROUND

Plug and Play is a technology where a device is automatically configured and managed by a network controller or a device management system. During the Plug and Play process, onboarding network devices into a network can be performed in a variety of ways. For example, a user can onboard the device using Dynamic Host Configuration Protocol (DHCP) server options, Domain Name System (DNS) server configuration, or by the device directly communicating with a network controller to register itself with the network controller. Many times, identifying information of the network controller is hard coded into the network device itself such that the device can directly connect to the network controller upon entering into the network. In such cases, the device retrieves identifying information of the network controller from the device itself to determine which network controller to be used for controlling the network device. Once registered, the network controller then proceeds to make the necessary changes to the device to onboard the device.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION OF EXEMPLARY EMBODIMENTS

Figure 1:
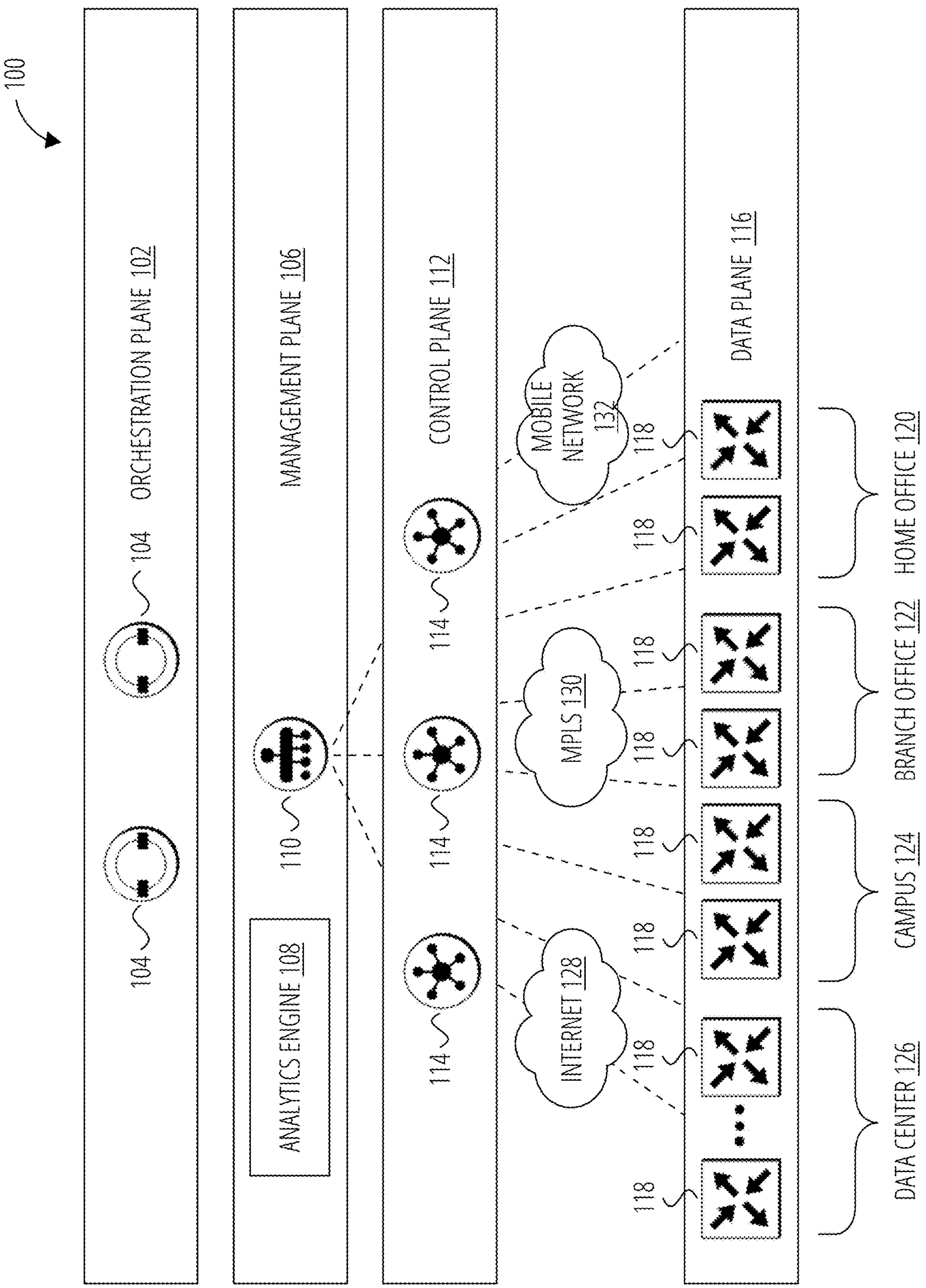
FIG. 1 illustrates an example of a high-level network architecture in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Joining a new group is never easy. This principle also applies to network communications when new network devices are onboarded onto the network. Onboarding the new network device is preferably done by a desired network controller after the network device registers itself with the network controller. Many times, the identifying information of the network controller is hard coded into the network device itself. But hard coding is self-limiting because it requires the network device to be associated with a specific controller, even if that controller is determined to be inadequate or not optimal.

When plugging in the device, the end user could want to direct the device to connect to a specific network controller that the end user believes is more suitable. But at the time of plugging the device in, the end user faces an initial hurdle: there is no means, at the time of plugging in the device, for the end user to specify the desired device controller that the plugged-in network device needs to contact. Currently, a controller specification has to be done prior to the device plugging in, either by making configuration changes to other devices in the network or by static pre-configuration on the network device being plugged in. At the time of plugging the device in, there is no option for the end users to identify and direct the plugged in device towards the correct Device Management System (DMS) that will configure, onboard and manage the plugged in device.

Another problem may occur if trying to onboard multiple devices of the same Vendor Class Identifier (VCI). If multiple such devices are plugged into ports in the same Virtual Local Area Network (VLAN), if the devices need to connect to different controllers, this requires significant configuration changes by the network administrator so that the devices will reach out to the correct controller.

The present technology provides an easier and more convenient method for onboarding network devices, during the Plug and Play process, by the use of voice commands or other user intent to input the network controller information. The technology can receive the user intent and then the technology can identify the appropriate controller to provision the device onboarding configurations.

The presently disclosed embodiments include a method, network device, and computer readable medium that perform the steps: indicating, by a network device, that the network device is awaiting input by a user; receiving, by the network device, user input specifying a user intent for the network device related to a registration of the network device on a network controller suitable for the network device; confirming, by the network device, that the user input is received and that the user input addresses the network device specifically; sending, by the network device, a transmission to determine the network controller for the network device based on the user intent; receiving, by the network device, a connection with the network controller; causing the network controller to register the network device on the network controller; and causing the network controller to configure a network to permit the network controller to control the network device.

In some embodiments, the user input is a voice command.

In some embodiments, the user intent specifies the network device using a tag.

In some embodiments, the tag specifies a group of a plurality of network devices that includes the network device.

In some embodiments, the steps further include receiving a tag modification user input from the user to modify the tag.

In some embodiments, the steps further include indicating, by the network device, that the user input was not received, and permitting the user to manually register the network device in response to no user input being received.

In some embodiments, the indicating, by the network device, that the network device is awaiting input by a user includes providing a notification through at least one of a light, display, audio output, and tactile output.

EXAMPLE EMBODIMENTS

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110. The management plane 106 can further include an analytics engine 108, as is known in the art.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 118.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 2:
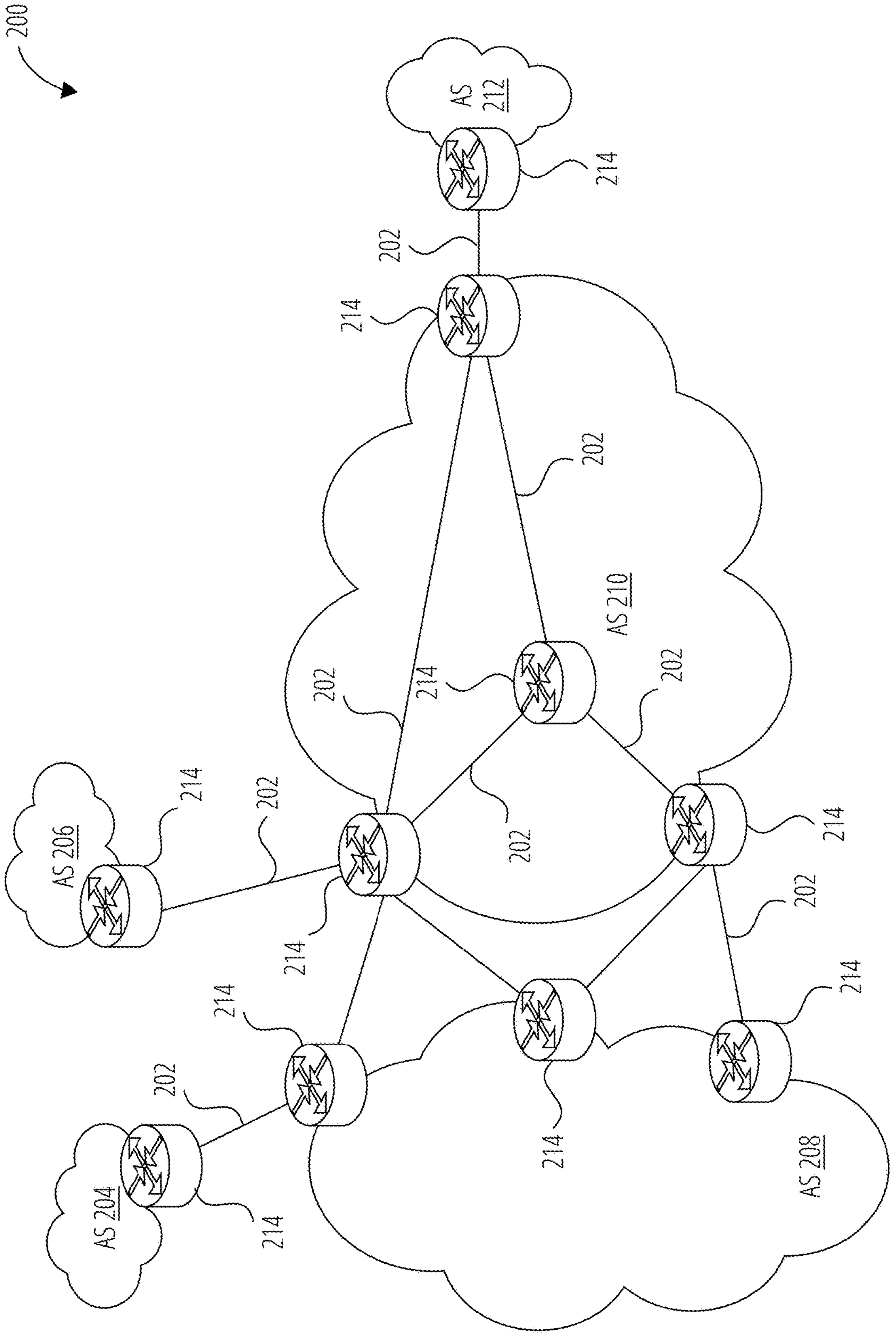
FIG. 2 illustrates an example communication network including one or more autonomous systems (ASes) in accordance with some embodiments of the present technology.

FIG. 2 is a schematic block diagram of an example computer network 200 illustratively comprising network devices 214 interconnected by various methods of communication. For instance, the communication paths 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network communication protocols such as certain known wired protocols, as well as wireless protocols or other shared-media protocols where appropriate.

The computer network 200 includes a set of autonomous systems (AS) labeled as AS 204, AS 206, AS 208, AS 210 and AS 212. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an AS may be a collection of connected Internet Protocol (IP) routing network devices 214 under the control of one or more network operators that presents a common, clearly defined routing policy to a network (e.g., the Internet). Usually, an AS comprises network devices 214 that are established on the edge of the system, and that serve as the system's ingress and egress points for network traffic. Moreover, the network devices 214 may be considered edge network devices, border routers, or core network devices within the respective AS. These network devices typically, but not always, are routers or any other element of network infrastructure suitable for switching or forwarding data packets according to a routing protocol or switching protocol. For the purposes of the present disclosure, the network devices 214 located within an AS may alternatively be referred to as "forwarding network devices" or "intermediate network devices." Moreover, for illustration purposes, the AS 204, AS 206, AS 208, AS 210, and AS 212 are shown with a limited number of network devices 214. In an actual implementation, however, an AS normally comprises numerous routers, switches, and other elements.

Each AS 204, AS 206, AS 208, AS 210, and AS 212 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the network devices 214 within the ASes, the network devices may exchange routing information to various network destinations. As described above, BGP is conventionally used to exchange routing and reachability information among network devices 214 within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (network devices 214), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., communication paths 202, may be referred to as an "AS_PATH." The AS_PATH attribute indicates the list of ASes that must be traversed to reach the address destination. For example, as illustrated in FIG. 2, the AS 212 may store an AS_PATH attribute of "204 206 210 212" where the address destination is the AS 212 (or a particular IP address within AS 212). Here, the AS_PATH attribute indicates that the path to the address destination AS 212 from AS 208 passes through AS 204, AS 206 and AS 210, in that order.

Although it may be preferable that all network devices 214 in AS 204, AS 206, AS 208, AS 210, and AS 212 be configured according to BGP, in a real-world implementation, it may be unlikely that each network device communicates using BGP. Thus, the disclosed embodiments are applicable to scenarios where all network devices 214 in the computer network 200 are configured according to BGP, as well as scenarios where only a subset of the network devices 214 is configured as such. Moreover, between any of the ASes, there may be a single communication path 202, e.g., between AS 204 and AS 208, as shown in FIG. 2, or there may be multiple communication paths 202, e.g., between AS 208 and AS 210. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

Figure 3:
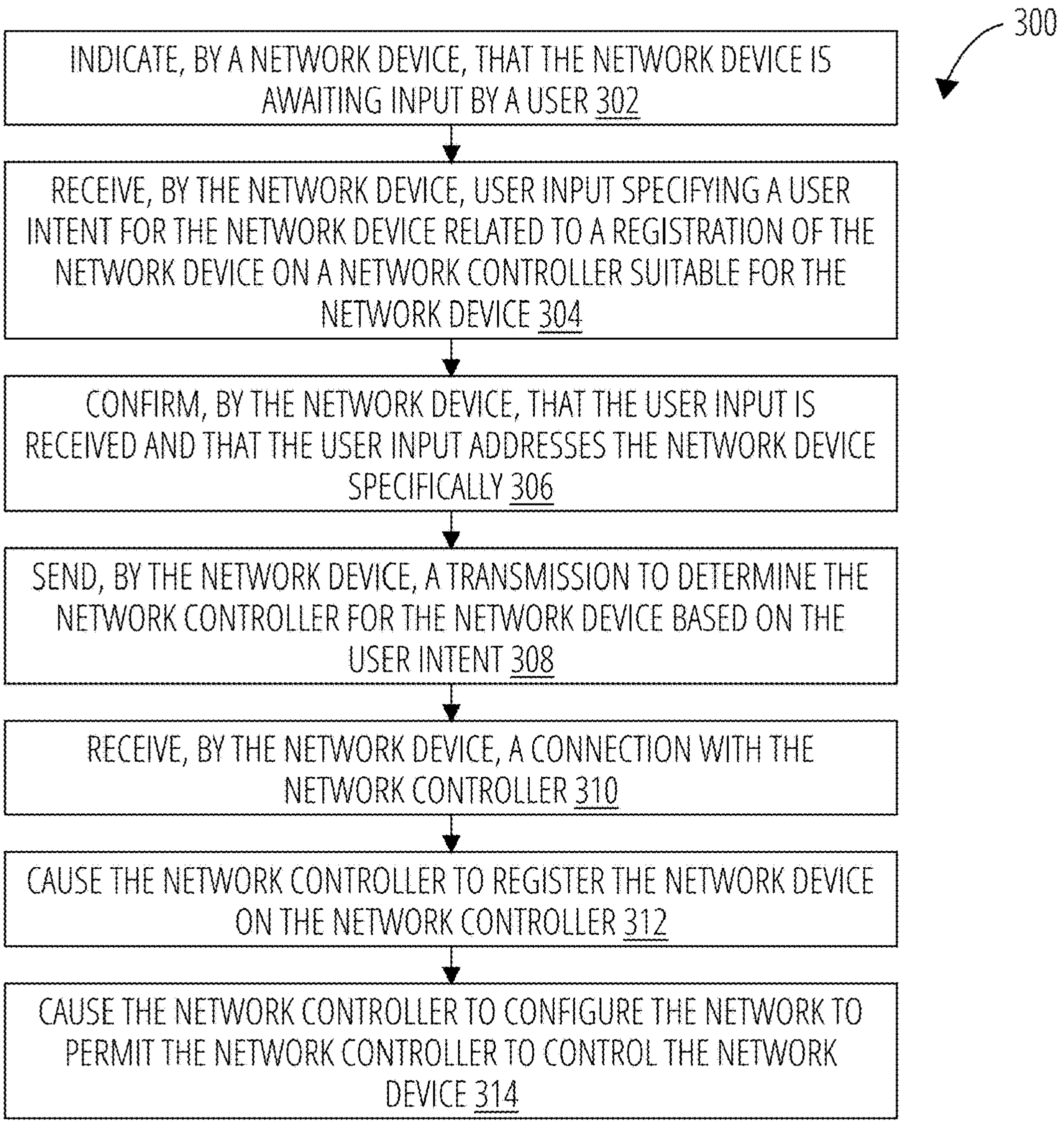
FIG. 3 illustrates a routine for registering a network device with a network controller in accordance with some embodiments of the present technology.

FIG. 3 illustrates a routine for registering a network device with a network controller in accordance with at least some embodiments of the present technology. Although the example routine 300 depicts a particular sequence of operations, the sequence may be altered without departing from the scope of the present disclosure. For example, some of the operations depicted may be performed in parallel or in a different sequence that does not materially affect the function of the routine 300. In other examples, different components of an example device or system that implements the routine 300 may perform functions at substantially the same time or in a specific sequence.

According to some examples, in block 302, routine 300 indicates, by a network device, that the network device is awaiting input by a user. For example, the network device can indicate to the user by providing a notification through at least one of a light, display, audio output, and tactile output. This process could begin upon the network device being powered on and determining that it is connected to a network. Thereafter, the network device could indicate to the user that it is awaiting input through a light (such as a light emitting diode (LED) light), a display (such as a liquid crystal display (LCD) or any other display), an audio output (such as an audio speaker), and/or a tactile output (for example, vibration, texture, or temperature). For example, an LED light could blink a red color to indicate the network device is awaiting input by the user. Any other form of indication can be implemented without departing from the present disclosure.

According to some examples, in block 304, routine 300 receives, by the network device, user input specifying a user intent for the network device related to a registration of the network device on a network controller suitable for the network device. For example, the user input could be a voice command and the network device can include a microphone that receives the voice command. However, the user intent can be any form of data input into the network device. For example, the user intent can be entered via a keyboard, mouse, touch screen, stylus, voice command, gesture, game controller, motion sensor, eye tracking, brain-computer interface, trackpad, joystick, buttons, dials, remote control, or any other form of input.

The user intent can be any data that represents the intent of the user. For example, the user intent can specify the network device using a tag. In this instance, the tag could be represented as a serial number (abbreviated below as "SN") that the user identifies when inputting user intent. For example, the user could input "SN1, set port1 IP address to 192.168.1.1." The tag can also specify a group of a plurality of network devices that includes the network device. For example, a user could enter through a voice command "Device group ABCD, set controller to 192.168.1.1." Identifying the network device and/or the network controller with such tags can therefore provide an easy and convenient way to enter the input. The tag can also be modified by a user or network administrator. In this manner, the technology can further include receiving a tag modification user input from the user to modify the tag. The user can modify the tag such that the technology can recognize the network device and/or the network controller using any nomenclature desired by the user.

The user intent can be derived by the user input in any way. For example, the user intent can be direct (such as the tag concept described above) or indirect (for example "SN1, connect to the controller located in United States East"). For the indirect intent scenario discussed above, the technology may need to determine the specific network controller attributable to the network device. Such determination may include a mapping system that links vague descriptions (e.g., "United States East") to specific network controllers based on predefined metadata, such as regions, zones, or naming conventions. The technology can also leverage user context or default settings to resolve ambiguities. This technology can reside on the network device itself or can reside on a separate network device, located on the network and connected to the network device by default when the network device is powered on and connected to the network. Any other manner of determining user intent from the user input can be implemented without departing from the spirit and scope of the present disclosure.

The routine 300 can further include indicating, by the network device, that the user input was not received, and permitting the user to manually register the network device in response to no user input being received. In this manner, the routine 300 understands that not every user will use the advancement that the present technology offers. For example, the routine 300 may blink an LED light for 60 seconds before determining the user is not going to enter any user intent input. In this scenario, the routine 300 can revert to the legacy methods of registering network devices, during the plug and play process, if no user input is received within a designated amount of time.

According to some examples, in block 306, routine 300 confirms, by the network device, that the user input is received and that the user input addresses the network device specifically. For example, and as discussed above, the network device may determine the user is addressing a specific network device by specifying the serial number of the network device. Any other manner of identifying the network device through user intent input can be implemented without departing from the present disclosure.

According to some examples, in block 308, routine 300 sends, by the network device, a transmission to determine the network controller for the network device based on the user intent. For example, and as discussed above, the user intent could identify a specific IP address of the network controller, or the user intent may indirectly identify the network controller so as to require further determination.

According to some examples, in block 310, routine 300 receives, by the network device, a connection with the network controller. For example, the determined network controller may then connect to the network device to complete the connection.

According to some examples, in block 312, routine 300 causes the network controller to register the network device on the network controller. The network controller may therefore identify, authenticate, and store information about the network device (e.g., IP address, MAC address, configuration settings) in its database to enable management, monitoring, and communication within the network.

According to some examples, in block 314, routine 300 causes the network controller to configure the network to permit the network controller to control the network device. For example, the network controller may set up the necessary communication protocols, routing paths, and permissions to establish a secure and functional link between the controller and the device, enabling remote management and operation.

Figure 4:
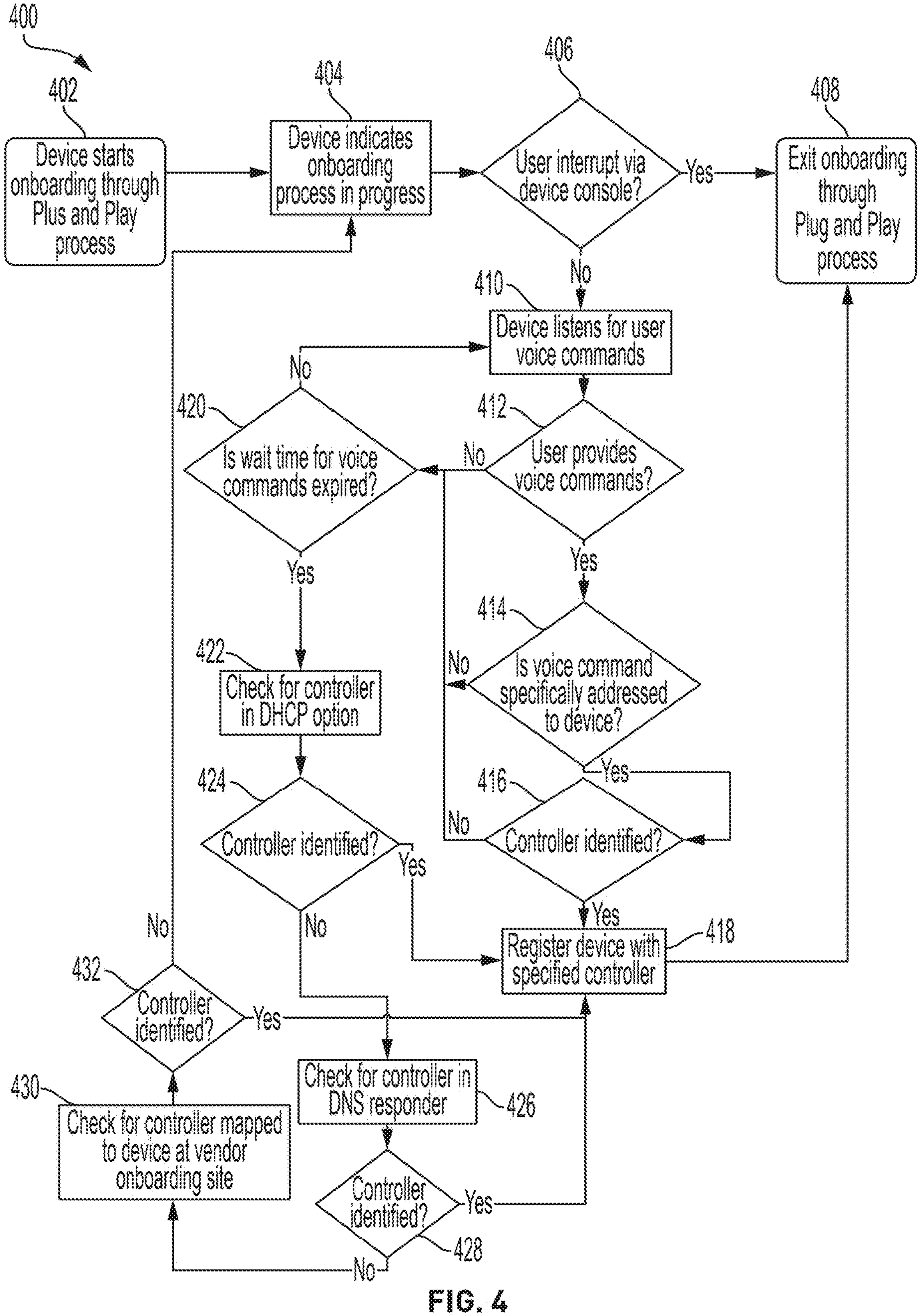
FIG. 4 illustrates an enlarged routine for registering the network device with the network controller in accordance with some embodiments of the present technology.

FIG. 4 illustrates another routine 400 for registering a network device with a network controller in accordance with at least some embodiments of the present technology. The routine 400 differs from the routine 300 in that the routine 400 is in some ways more detailed in flowchart form.

As shown, the routine 400 includes the device starting the onboarding process in block 402. This may include the network device being powered on and "listening" (literally or figuratively) for an input from the user indicating the user intent.

The routine 400 can then proceed to block 404, where the device indicates that the onboarding process is in progress. For example, the device may include an LED that blinks so as to indicate it is listening for user input.

The routine 400 can then proceed to block 406, where it is determined whether the user interrupted the onboarding process through the device console. For example, the user may enter a voice command that states "onboard manually" or may otherwise exit the present technology, e.g., by input on a touch screen. If so, the routine 400 proceeds to block 408 where the onboarding process flow is exited. Otherwise, the routine 400 proceeds to block 410.

In block 410, the device listens for, e.g., voice commands from the user. Voice commands are provided as the example of routine 400 but the present technology is so limited and can include any form of user input. In this example, the routine 400 listens for voice commands in block 410 and proceeds to block 412 to determine whether a voice command has been received. For example, the routine 400 can determine whether a voice command has been received by continuously analyzing input from a microphone for predefined keywords or activation phrases using speech recognition algorithms. Any other manner of determining whether the user has entered a voice command can be implemented.

If the routine 400 determines a voice command has been received, the routine 400 can proceed to block 414 and determine whether the voice command is specifically addressed to the network device. Recall that the technology can, in some embodiments, reside on the network device or be focused on the onboarding of the network device, such that commands for other network devices may not be as relevant. In block 414, the routine 400 can analyze the user intent of the user input to determine whether the user input is directed to the specific network device at hand. This can occur through the user intent specifying the serial number of the network device or through any other direct or indirect means. If the user input does not specifically address the network device, the routine 400 can revert to block 412 as shown.

If the user input specifically addresses the network device, the routine 400 can then proceed to block 416 where it is determined whether the controller is identified through the user input. If so, the routine proceeds to block 418 where the network device is registered with the specified controller and then the routine proceeds to block 408 where it ends. If not, the routine can revert to block 412.

Some embodiments of the present technology provide a wait time for a user provide input. For example, in the voice command example of routine 400, the user may input a voice command at block 412. If the user does not within a specified amount of time, the routine 400 determines whether a wait time for a voice command has expired in block 420. If not, the network device listens for user voice commands in block 410. If so, the routine 400 checks for a controller in a DHCP option in block 422 and proceeds to block 424 where it is determined whether the controller is identified. If so, the network device is registered with the controller at block 418 and the routine 400 proceeds to block 408 where it ends. If not, the routine 400 proceeds to block 426 to check for the controller in Domain Name System (DNS) responder, i.e., querying a DNS service to resolve the domain name associated with a network controller into its corresponding IP address, enabling communication with the controller.

The routine 400 then again determines whether the controller is identified in block 428 and registers the device (block 418) before ending the routine (block 408). If not, the routine 400 checks for a controller mapped to the device at a vendor onboarding site at block 430. Here, the routine 400 verifies with the vendor's provisioning system whether a specific device is registered and associated with a designated network controller for configuration and management, for example. The routine then proceeds to block 432 where it is again determined whether the controller is identified and, if so, registers the device (block 418) and the routine ends (block 408). Otherwise, the routine "gives up" and begins the onboarding process again by, for example, proceeding to block 404 where, for example, it causes the LED light to blink so as to indicate the routine 400 is listening for user input.

Figure 5:
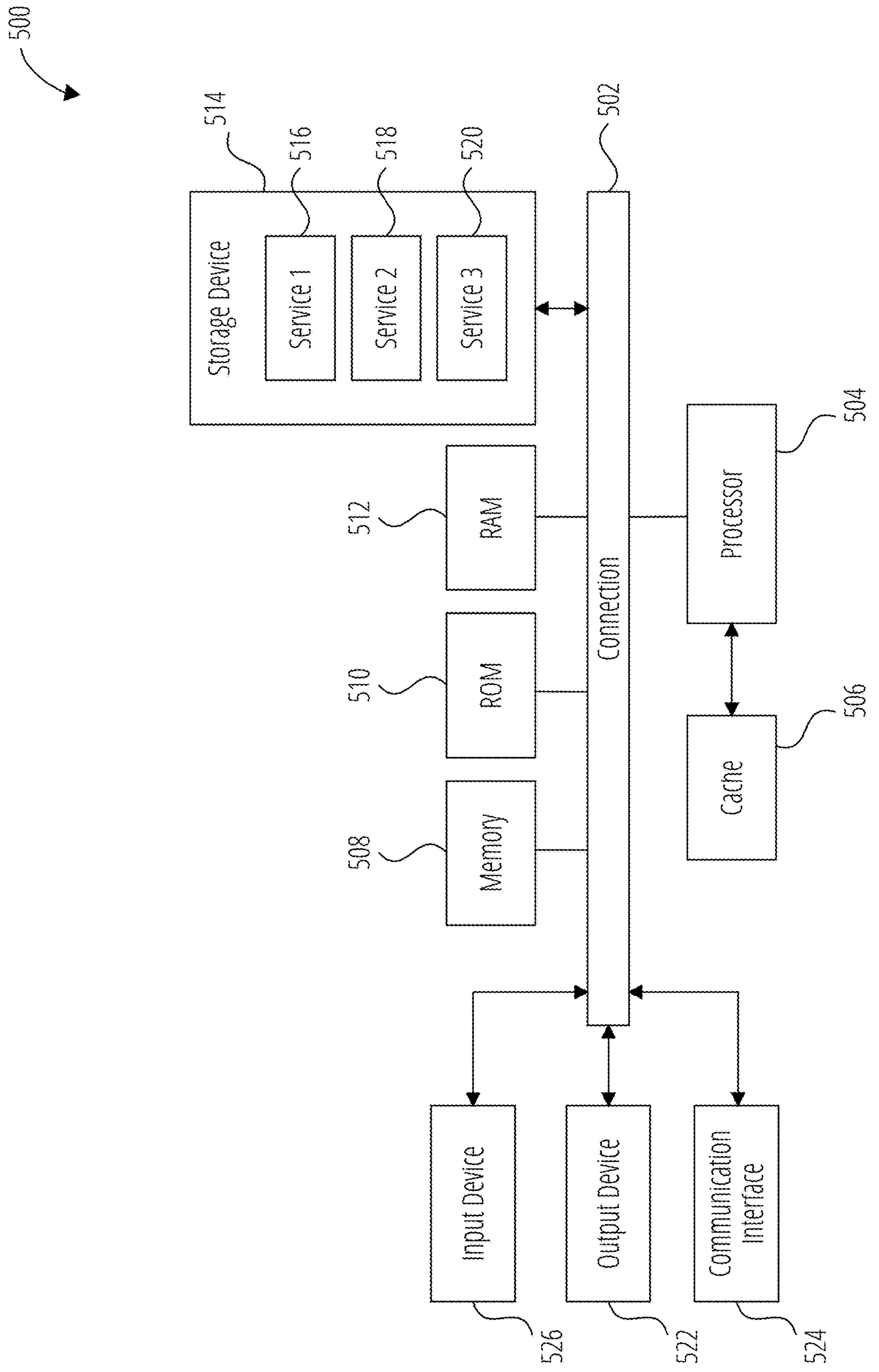
FIG. 5 shows an example of a system for implementing certain aspects of the present technology.

FIG. 5 shows an example of computing system 500, which can be for example any computing device making up a network device such as a router, switch, user device, or any other network device; and/or for example a controller of an SDWAN network, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art, for example a visual, audio, tactile, or other such mechanism capable of delivering any form of output to the user. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method comprising indicating, by a network device, that the network device is awaiting input by a user; receiving, by the network device, user input specifying a user intent for the network device related to a registration of the network device on a network controller suitable for the network device; confirming, by the network device, that the user input is received and that the user input addresses the network device specifically; sending, by the network device, a transmission to determine the network controller for the network device based on the user intent; receiving, by the network device, a connection with the network controller; causing the network controller to register the network device on the network controller; and causing the network controller to configure a network to permit the network controller to control the network device.

Aspect 2. The method of Aspect 1, wherein the user input is a voice command.

Aspect 3. The method of Aspect 1, wherein the user intent specifies the network device using a tag.

Aspect 4. The method of Aspect 3, wherein the tag specifies a group of a plurality of network devices that includes the network device.

Aspect 5. The method of Aspect 3, further comprising receiving a tag modification user input from the user to modify the tag.

Aspect 6. The method of Aspect 1, further comprising indicating, by the network device, that the user input was not received, and permitting the user to use legacy methods to register the network device with a network controller in response to no user input being received.

Aspect 7. The method of Aspect 1, wherein indicating, by the network device, that the network device is awaiting input by a user includes providing a notification through at least one of a light, display, audio output, and tactile output.

Aspect 8. A network device comprising a storage configured to store instructions; and at least one processor configured to execute the instructions and cause the at least one processor to indicate that the network device is awaiting input by a user; receive user input specifying a user intent for the network device related to a registration of the network device on a network controller suitable for the network device; confirm that the user input is received and that the user input addresses the network device specifically; send a transmission to determine the network controller for the network device based on the user intent; receive a connection with the network controller; cause the network controller to register the network device on the network controller; and cause the network controller to configure a network to permit the network controller to control the network device.

Aspect 9. The network device of Aspect 8, wherein the user input is a voice command.

Aspect 10. The network device of Aspect 8, wherein the user intent specifies the network device using a tag.

Aspect 11. The network device of Aspect 10, wherein the tag specifies a group of a plurality of network devices that includes the network device.

Aspect 12. The network device of Aspect 10, wherein the at least one processor is configured to execute the instructions and further cause the at least one processor to receive a tag modification user input from the user to modify the tag.

Aspect 13. The network device of Aspect 8, wherein the at least one processor is configured to execute the instructions and further cause the at least one processor to indicate that the user input was not received and permit the user to use legacy methods to register the network device with a network controller in response to no user input being received.

Aspect 14. The network device of Aspect 8, wherein the at least one processor being configured to execute the instructions and cause the at least one processor to indicate that the network device is awaiting input by the user includes providing a notification through at least one of a light, display, audio output, and tactile output.

Aspect 15. A non-transitory computer-readable storage medium including instructions that, when executed by at least one processor, cause the at least one processor to indicate that a network device is awaiting input by a user; receive user input specifying a user intent for the network device related to a registration of the network device on a network controller suitable for the network device; confirm that the user input is received and that the user input addresses the network device specifically; send a transmission to determine the network controller for the network device based on the user intent; receive a connection with the network controller; cause the network controller to register the network device on the network controller; and cause the network controller to configure a network to permit the network controller to control the network device.

Aspect 16. The non-transitory computer-readable storage medium of Aspect 15, wherein the user input is a voice command.

Aspect 17. The non-transitory computer-readable storage medium of Aspect 15, wherein the user intent specifies the network device using a tag.

Aspect 18. The non-transitory computer-readable storage medium of Aspect 17, wherein the tag specifies a group of a plurality of network devices that includes the network device.

Aspect 19. The non-transitory computer-readable storage medium of Aspect 17, wherein the at least one processor is configured to execute the instructions and further cause the at least one processor to receive a tag modification user input from the user to modify the tag.

Aspect 20. The non-transitory computer-readable storage medium of Aspect 15, wherein the at least one processor is configured to execute the instructions and further cause the at least one processor to indicate that the user input was not received and permit the user to use legacy methods to register the network device with a network controller in response to no user input being received.

What is claimed is:

1. A method comprising:

indicating, by a network device responsive to the network device connecting to a network, that the network device is awaiting input by a user for onboarding of the network device;

receiving, by the network device and responsive to the indicating, user input including content specifying a user intent for the network device related to a registration of the network device on a network controller suitable for the network device, wherein the user input is a voice command and the user intent identifies the network controller for the network device;

confirming, by the network device, that the user input is received and that the user input addresses the network device specifically based on the user intent;

sending, by the network device, a transmission to determine the network controller for the network device based on the user intent;

receiving, by the network device, a connection with the network controller;

causing the network controller to register the network device on the network controller; and causing the network controller to configure a network to permit the network controller to control the network device.

2. The method of claim 1, wherein the user intent specifies the network device using a tag.

3. The method of claim 2, wherein the tag specifies a group of a plurality of network devices that includes the network device.

4. The method of claim 2, further comprising receiving a tag modification user input from the user to modify the tag.

5. The method of claim 1, further comprising indicating, by the network device, that the user input was not received, and permitting the user to use legacy methods to register the network device with a network controller in response to no user input being received.

6. The method of claim 1, wherein indicating, by the network device, that the network device is awaiting input by a user includes providing a notification through at least one of a light, display, audio output, and tactile output.

7. A network device comprising:

a storage configured to store instructions; and at least one processor configured to execute the instructions and cause the at least one processor to:

indicate, responsive to the network device connecting to a network, that the network device is awaiting input by a user for onboarding of the network device;

receive, responsive to the instructions to indicate, user input including content specifying a user intent for the network device related to a registration of the network device on a network controller suitable for the network device, wherein the user input is a voice command and the user intent identifies the network controller for the network device;

confirm that the user input is received and that the user input addresses the network device specifically based on the user intent;

send a transmission to determine the network controller for the network device based on the user intent;

receive a connection with the network controller;

cause the network controller to register the network device on the network controller; and cause the network controller to configure a network to permit the network controller to control the network device.

8. The network device of claim 7, wherein the user intent specifies the network device using a tag.

9. The network device of claim 8, wherein the tag specifies a group of a plurality of network devices that includes the network device.

10. The network device of claim 8, wherein the at least one processor is configured to execute the instructions and further cause the at least one processor to receive a tag modification user input from the user to modify the tag.

11. The network device of claim 7, wherein the at least one processor is configured to execute the instructions and further cause the at least one processor to indicate that the user input was not received and permit the user to use legacy methods to register the network device with a network controller in response to no user input being received.

12. The network device of claim 7, wherein the at least one processor being configured to execute the instructions and cause the at least one processor to indicate that the network device is awaiting input by the user includes providing a notification through at least one of a light, display, audio output, and tactile output.

13. A non-transitory computer-readable storage medium including instructions that, when executed by at least one processor, cause the at least one processor to:

indicate, responsive to the network device connecting to a network, that the network device is awaiting input by a user for onboarding of the network device;

receive, responsive to the instructions to indicate, user input including content specifying a user intent for the network device related to a registration of the network device on a network controller suitable for the network device, wherein the user input is a voice command and the user intent identifies the network controller for the network device;

confirm that the user input is received and that the user input addresses the network device specifically based on the user intent;

send a transmission to determine the network controller for the network device based on the user intent;

receive a connection with the network controller;

cause the network controller to register the network device on the network controller; and cause the network controller to configure a network to permit the network controller to control the network device.

14. The non-transitory computer-readable storage medium of claim 13, wherein the user intent specifies the network device using a tag.

15. The non-transitory computer-readable storage medium of claim 14, wherein the tag specifies a group of a plurality of network devices that includes the network device.

16. The non-transitory computer-readable storage medium of claim 14, wherein the at least one processor is configured to execute the instructions and further cause the at least one processor to receive a tag modification user input from the user to modify the tag.

17. The non-transitory computer-readable storage medium of claim 13, wherein the at least one processor is configured to execute the instructions and further cause the at least one processor to indicate that the user input was not received and permit the user to use legacy methods to register the network device with a network controller in response to no user input being received.

* * * * *